April 4, 1967   E. B. CARPENTER   3,312,328
FEED INTAKE FOR FEEDER HOPPER
Filed Nov. 5, 1965

INVENTOR.
ELMER B. CARPENTER
BY
ATTORNEYS

United States Patent Office 3,312,328
Patented Apr. 4, 1967

3,312,328
FEED INTAKE FOR FEEDER HOPPER
Elmer B. Carpenter, Springdale, Ark., assignor to Big Dutchman, Inc., Zeeland, Mich., a corporation of Michigan
Filed Nov. 5, 1965, Ser. No. 506,459
8 Claims. (Cl. 198—57)

This invention relates to automated feeding equipment, and more particularly to a new and unique feed intake apparatus for the feed return of automated feeding equipment.

As is well known, almost all automated feeding equipment is characterized by a feed supply hopper, one or more feeding troughs which trace a closed path to and from the supply hopper throughout a given area, and an endless conveyor means which travels within each of the feed troughs to distribute feed from the hopper throughout the length of the troughs. The feed return portion of such automated systems is that area where the troughs return to the supply hopper and reenter it, and it is in this area that a difficult and bothersome problem has occurred and reoccurred practically since the advent of the first automated feeding equipment. This problem is that of reintroducing into the supply hopper the varying quantities of feed which may remain in the trough at the point where it returns to the hopper. Under almost any feeding condition, at least a small amount of feed will be returned to the hopper in this manner, and due to the feeding peculiarities of the poultry or other animals being fed, the return trough may at times be almost filled with feed. If measures are not taken, this feed will quickly begin to pile up at the inlet to the hopper, and it will then begin to spill out from the return trough to create a condition of extreme waste which manifestly cannot long be tolerated.

A wide variety of devices have been conceived in the past for the purpose of alleviating the foregoing condition. Such devices have taken many forms, including feed elevators which in one manner or another remove the feed from the trough before it enters the hopper and continuously raise the removed feed over and above the hopper, so that it may then drop into the top of the hopper. An example of such a system as this is seen in U.S. Patent No. 2,742,020, assigned to the assignee of the present invention. Other devices have included different types of apparatus for compressing or compacting the feed being returned to the hopper, since this has been found to facilitate the movement of this feed into the interior of the hopper and into the mass of bulk feed contained therein. An early example of a successful device of this nature is illustrated in U.S. Patent No. 2,866,536, also assigned to the assignee of the present invention. Although certain of such previous devices have in general been successful, the wide variety of different feeds utilized in automated feeding and the widely varying conditions of each installation of automated equipment have served to perpetuate the basic problem of feed reentry, and to create continuing instances where new and different mechanisms are required for overcoming this important problem.

Accordingly, it is a major object of the present invention to provide a new feed return intake apparatus for automated feeding equipment having a unique structural form which in effect compacts and funnels feed from the return trough back into the hopper, to provide an unusual and very effective feed return affording very desirable operation and results.

The objects of the invention and the advantages made possible thereby will become increasingly apparent to those skilled in the pertinent arts following a consideration of the ensuing specification and its appended claims, particularly when taken in conjunction with the accompanying illustrative drawings setting forth a preferred embodiment of the invention.

Briefly stated, the present invention provides a feed return intake apparatus for automated feeding equipment of the type which is characterized by a supply hopper, a feed return trough communicating with the supply hopper, and a conveyor means traveling within the trough. The intake apparatus may be said to be a convergent channel means having side and top walls, and arranged to be located within the feed return trough and to extend partially into the hopper. The channel means converges in the direction of motion of the conveyor, and receives between its walls the feed being returned to the hopper. As the feed passes through the converging channel, it is compacted between the channel and the bottom of the trough, such that the feed is compressed to pass easily into the hopper without spilling from the trough.

Figure 1:
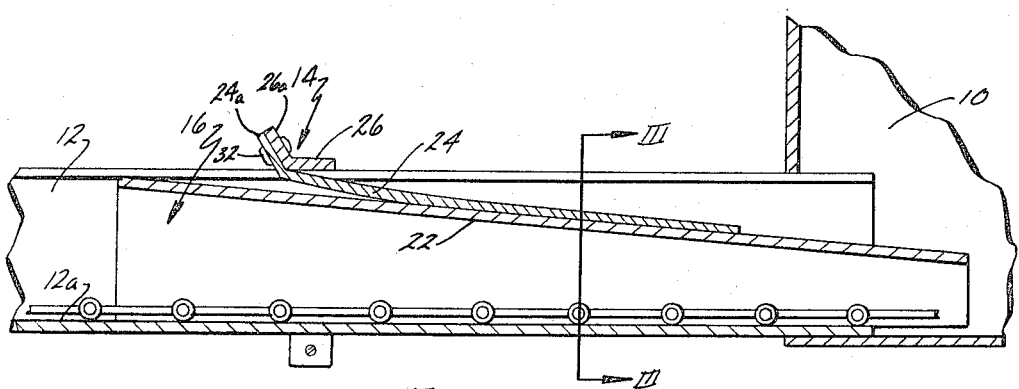
FIG. 1 is a fragmentary, central sectional view illustrating a feed hopper and return trough, together with the intake apparatus of the invention.

Referring now in more detail to the drawings, in FIG. 1 a portion of a typical feed supply hopper 10 is illustrated with a return trough 12 entering the hopper at its inlet. Typically, the end of the trough is inserted into the hopper inlet a brief distance such as for example one and one-half inches. A conveyor means (not specifically shown) moves through the complete length of the trough and passes through the bottom of the supply hopper, where bulk feed from within the hopper is drawn outwardly therefrom and moved through the length of the feeder trough.

The feed return intake apparatus 14 of the invention is seen in FIG. 1 communicating lengthwise with the return trough 12 and the supply hopper 10, at the inlet to the latter. By referring to all of the figures, it will be seen that the intake apparatus includes an inverted generally U-shaped open channel section 16, having generally parallel side walls 18 and 20, and a top wall 22 interconnecting the side walls. It is to be noted that the side walls 18 and 20 are tapered and decrease in height as they approach the supply hopper 10, and that consequently the top wall 22 gradually approaches the bottom 12a of the feed return trough 12. Thus, the composite channel section 16 may be said to be convergent in nature.

Figure 3:
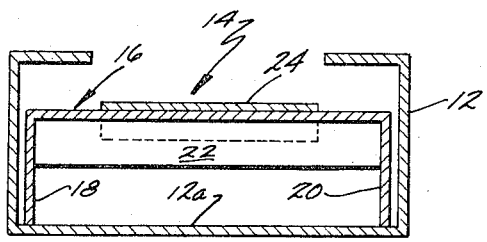
FIG. 3 is an enlarged sectional view taken through the transverse plane III—III of FIG. 1.
Figure 2:
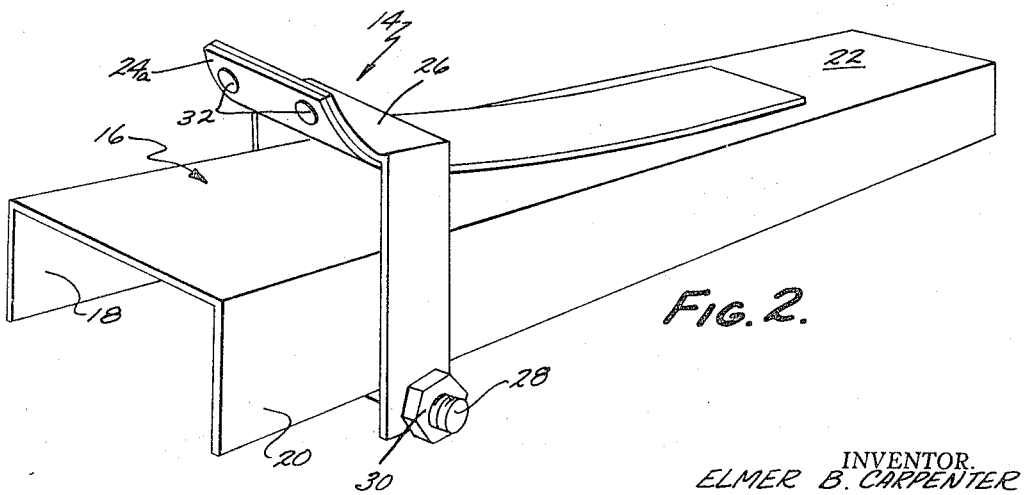
FIG. 2 is an enlarged, frontal perspective view illustrating the intake apparatus of the invention.

As best seen in FIG. 3, the distance between the side walls 18 and 20 should preferably be substantially the same as the distance across the inside of the feed return trough 12, so that little or no feed can pass between the channel section and the trough. The preferred location for the channel section is seen in FIG. 1, where is will be observed that the channel section preferably extends into the interior of the supply hopper a brief distance beyond the end of the return trough 12.

The channel section 16 is placed within the return trough 12 with the bottom extremities of the side walls 18 and 20 of the channel resting upon the bottom 12a of the trough. The channel section is retained in position by a leaf spring 24, which contacts the upper surface of the top wall 22 and exerts a downward pressure thereupon. The leaf spring 24 is itself retained in position by connecting it to a U-shaped clamp 26 which is placed over the top of the leaf spring and about the trough 12 in an inverted position, such that the two legs of the clamp 26 depend downwardly and extend below the bottom 12a of the trough. The clamp 26 is secured in this position by a bolt 28 extending through appropriate apertures formed in each of the legs of the clamp and having a locking nut 30 threaded upon the bolt and tightened against the leg of the clamp. The rearward portion 24a of the leaf spring 24 is preferably upturned at an angle in the manner indicated, so as to rest against the rearward side of a similarly angled flange portion 26a of the clamp 26. A pair of fastening devices such as the rivets 32 are preferably utilized to join the spring portion 24a and the flange portion 26a fixedly together, thereby retaining the spring 24 in place relative to the clamp 26. The forward portion of the spring 24 is elongated in nature and converges gradually toward the sloping top wall 22 of the channel section 16, such that a substantial area of the top wall is contacted by a major part of the lower or forward portion of the spring.

Having already indicated the preferred structural details of the invention, and having also indicated the manner of its assembly with the environmental portions of the associated automated feeding equipment, the operation of the combination will likely be apparent.

As feed is returned within the return trough 12 to the supply hopper 10 by the conveyor means traveling within the trough, the feed encounters and passes into the rearward or upward portion of the open channel section 16, which is substantially the same height and width as the trough itself (see FIG. 1). As the feed is continually drawn toward the hopper by the conveyor means, it traverses the length of the channel section 16. Due to the tapered side walls 18 and 20 and the converging top wall 22 provided thereby, the feed is gradually compacted or compressed throughout the length of the channel section, and it thus readily enters the supply hopper and is assimilated into the mass of bulk feed located therewithin.

When substantial amounts of feed are being returned to the hopper, the volume of the feed in the lower or forward part of the channel section may be sufficient to tend to force the channel upward, even though this feed has been compacted and reduced in volume from the state in which it entered the channel section. When this occurs, the leaf spring 24 makes the compacting action of the intake apparatus uniform, in that it exerts a steady downward force against the top wall of the channel section tending to retain the channel section in place against the bottom 12a of the trough 12, under the upward force of the feed passing therethrough. Thus, the feed will be substantially uniformly compacted as it traverses the channel section. If particularly large amounts of feed are moved through it, the channel section may actually be raised somewhat from the floor 12a of the return trough. Nevertheless, the action of the leaf spring upon the channel will cause it to exert a uniform compacting pressure upon the feed.

From the foregoing, those skilled in the art of automatic feeding equipment will recognize that the present invention provides a unique and extremely useful apparatus having distinct advantages in certain cases and having an unusually simple and sturdy construction which provides for low installation costs and a long and durable life of operation. While a preferred embodiment of the inventive concept has been illustrated herein, it is possible that certain other embodiments, together with certain variations and modifications of the particular embodiment shown, will be suggested to those skilled in the art upon becoming familiar with the structure illustrated as described herein. Consequently, all such further embodiments, variations, and modifications as incorporate the spirit of the invention and are based upon its underlying concept are to be considered as within the scope of the claims appended herebelow, unless these claims by their language specifically state otherwise.

I claim:

1. A feed return intake apparatus for automated feeding equipment of the type characterized by a supply hopper, a feed return trough communicating with said hopper, and a conveyor means traveling within said trough, said return apparatus comprising: a convergent channel means having side and top walls positioned within said trough and retained therein, said channel means extending partially into said hopper, and converging in the direction of motion of said conveyor means to provide a feed path of progressively decreasing cross section between said walls and a section of said trough; said channel means receiving feed return to said hopper by said conveyor and compacting such feed between said channel means and the bottom of said trough, such that the feed is compressed to pass easily into said hopper without spilling from the trough.

2. The feed return intake apparatus of claim 1, wherein said channel means is substantially as wide as the inside of said trough, such that substantially all feed being returned to said hopper must pass through the channel.

3. The feed return intake apparatus of claim 1, wherein the said side walls are essentially parallel to each other and are tapered in height, such that the said top wall converges toward the bottom of the trough.

4. A feed return intake apparatus for automated feeding equipment of the type characterized by a supply hopper, a feed return trough communicating with said hopper, and a conveyor means traveling within said trough, said return apparatus comprising: a convergent channel means having side and top walls positioned within said trough and retained therein, said channel means extending partially into said hopper, and converging in the direction of motion of said conveyor means to provide a feed path of progressively decreasing cross section between said walls and a section of said trough; and means for exerting a steady downward force upon said channel means; said channel means receiving feed returned to said hopper by said conveyor and compacting such feed between the converging portions of its walls and the bottom of said trough with a uniform force such that the feed is compressed to pass easily into said hopper without spilling from the trough.

5. The feed return intake apparatus of claim 4, wherein said structure for exerting a downward force upon said channel means is a resilient spring means supported in place upon said trough and in contact with said top wall of said channel means.

6. The feed return apparatus of claim 5, wherein said channel means is elongated, and said resilient spring means is an elongate leaf spring having an elongated area of contact with the top wall of said channel means.

7. The feed return apparatus of claim 6, wherein said channel means is substantially as wide as the inside of said trough, such that substantially all feed being returned to said hopper must pass through the channel.

8. The feed return intake apparatus of claim 7, wherein the said side walls are essentially parallel to each other and are tapered in height, such that the said top wall converges toward the bottom of the trough.

References Cited by the Examiner
UNITED STATES PATENTS
3,241,653   3/1966   Van Huis _____ 198—57

EVON C. BLUNK, *Primary Examiner.*

RICHARD E. AEGERTER, *Examiner.*